United States Patent
Rivera

(10) Patent No.: US 9,112,993 B1
(45) Date of Patent: Aug. 18, 2015

(54) SHOWER TRANSMITTER/RECEIVER SPEAKER SYSTEMS

(71) Applicant: Joe A. Rivera, Newark, NJ (US)

(72) Inventor: Joe A. Rivera, Newark, NJ (US)

( * ) Notice: Subject to any disclaimer, the term of this patent is extended or adjusted under 35 U.S.C. 154(b) by 0 days.

(21) Appl. No.: 14/476,671

(22) Filed: Sep. 3, 2014

Related U.S. Application Data

(60) Provisional application No. 61/881,866, filed on Sep. 24, 2013.

(51) Int. Cl.
| | | |
|---|---|---|
| *H04M 3/00* | (2006.01) | |
| *H04M 1/725* | (2006.01) | |
| *H04M 1/60* | (2006.01) | |
| *H04W 4/00* | (2009.01) | |
| *A47K 17/00* | (2006.01) | |
| *A47K 3/28* | (2006.01) | |
| *A47K 5/18* | (2006.01) | |
| *H04W 88/02* | (2009.01) | |

(52) U.S. Cl.
CPC ............ *H04M 1/7258* (2013.01); *A47K 3/281* (2013.01); *A47K 5/18* (2013.01); *A47K 17/00* (2013.01); *H04M 1/6033* (2013.01); *H04W 4/008* (2013.01); *H04W 88/02* (2013.01)

(58) Field of Classification Search
CPC ... H04W 8/245; H04W 76/005; H04W 84/14; H04L 29/08108; H04M 1/0214; H04R 2499/11; G02B 6/4452; F01M 11/0458; C11D 17/049; A47K 3/30; A47K 3/281; E03C 1/0408; E03C 1/06
USPC .................. 455/41.2, 41.3, 90.1, 90.2, 414.1, 455/418–420; 381/334; 211/26.2; 206/223, 206/230; 4/596, 597, 601, 605

See application file for complete search history.

(56) References Cited

U.S. PATENT DOCUMENTS

| | | | | |
|---|---|---|---|---|
| 3,923,162 | A | * | 12/1975 | Hussey .......................... 211/119 |
| D274,393 | S | * | 6/1984 | Sinchok ......................... D6/525 |
| D278,288 | S | * | 4/1985 | Talocci et al. .................. D6/525 |
| D286,599 | S | * | 11/1986 | Sussman ........................ D6/525 |
| D288,510 | S | * | 3/1987 | Shames et al. ................. D6/525 |
| 4,964,181 | A | * | 10/1990 | Alpert ............................... 4/597 |
| 5,140,254 | A | * | 8/1992 | Katzman ......................... 322/35 |
| 5,255,401 | A | * | 10/1993 | Sambrookes et al. ............ 4/605 |
| 5,329,650 | A | | 7/1994 | Zaccai |
| D377,015 | S | | 12/1996 | Ford |
| 5,664,015 | A | | 9/1997 | Ford |
| D393,974 | S | * | 5/1998 | Davis ............................. D6/544 |
| 6,973,682 | B2 | * | 12/2005 | Zhadanov ......................... 4/601 |
| 8,113,346 | B1 | * | 2/2012 | Lai ................................ 206/320 |
| 8,719,975 | B2 | * | 5/2014 | Phillips et al. .................... 4/597 |
| 2007/0044877 | A1 | * | 3/2007 | Davidoff et al. .............. 150/113 |
| 2013/0305488 | A1 | * | 11/2013 | Dodge et al. .................... 16/245 |
| 2013/0341216 | A1 | * | 12/2013 | Panzella ........................ 206/223 |
| 2014/0193017 | A1 | * | 7/2014 | Fortin ............................ 381/334 |
| 2014/0319083 | A1 | * | 10/2014 | Stark ............................... 211/26 |
| 2015/0105024 | A1 | * | 4/2015 | Chen ............................. 455/41.3 |

* cited by examiner

*Primary Examiner* — Steve D Agosta

(74) *Attorney, Agent, or Firm* — RG Patent Consulting, LLC; Rachel Gilboy

(57) ABSTRACT

A shower transmitter/receiver speaker system is an electronic device that is able to be paired to a cell phone, a lap top, or a tablet and is able to receive voice and streaming music transmissions from the cell phone. The shower transmitter/receiver speaker system is also able to place phone calls or transmit voice commands to the cell phone. The shower music receiver assembly is able to receive and amplify the audio to a user preferred volume using the control button volume adjustment.

8 Claims, 4 Drawing Sheets

SHOWER TRANSMITTER/RECEIVER SPEAKER SYSTEMS

CROSS-REFERENCE TO RELATED APPLICATION

The present application is related to and claims priority from prior provisional application Ser. No. 61/881,866, filed Sep. 24, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of personal wireless transmitter/receiver devices and more specifically relates to a shower transmitter/receiver speaker system.

DESCRIPTION OF THE RELATED ART

One of the most innovative new technologies to come out in the last twenty years is the cellular telephone. In 1994, 16 million Americans were subscribers to cellular phone services. By 2002, that number had ballooned to more than 110 million, and still shows no sign of slowing down. The basic concept of cellular phones began in 1947, when AT&T researchers sought ways to increase the traffic capacity and frequency of mobile communication in police car radios.

Nonexistent technology however, and stringent FCC regulations, postponed availability until 1982 when the FCC authorized commercial cellular use. As a result of this regulation, the scientific advances of the intervening years and increased competition among communications companies put the cellular telephone on the fast track. Today's widespread use of these revolutionary devices is unsurprising, since they now offer a virtually endless array of benefits. In addition to serving as a practical means of communication while on the go, technological advances have evolved cell phones into mini computers.

Today's cell phones have many functions that take the place of numerous devices. In addition to portable phones, they act as watches, calendars, alarm clocks, GPS units, maps, music players, libraries, cameras, calculators, televisions, and flashlights just to name a few. With the advent of micro transmitter/receiver technology, specifically the technology that pairs a separate capable electronic device with the cell phone, the functions of the cell phone are able to be accessed with communications and commands audibly transmitted back and forth between the two. The wireless technology is most generally used with a phone call transmitter/receiver device, but there are many functions that such a device could be used with. Since cell phones these days generally take the place of personal music devices, a device that could receive and transmit phone calls as well as transmit and amplify music in very wet environments such as showers where the cell phone can't go, would add functionality to the technology.

Various attempts have been made to solve the above-mentioned problems such as those found in U.S. Pat. No. 5,664,015 to Joseph E. Ford et al, U.S. Pat. No. 5,329,650 to Gianfranco Zaccai et al, and U.S. Design Pat. No. D377,015 to Joseph E. Ford et al. This art is representative of wireless transmitter/receiver devices. None of the above inventions and patents, taken either singly or in combination, is seen to describe the invention as claimed.

Ideally, a personal wireless transmitter/receiver device for use in showers should provide convenience of use of a universal personal electronic wireless enabled device for listening to music and taking or receiving phone calls while showering, and yet, would operate reliably and be manufactured at a modest expense. Thus, a need exists for a reliable shower transmitter/receiver speaker system to avoid the above-mentioned problems.

BRIEF SUMMARY OF THE INVENTION

In view of the foregoing disadvantages inherent in the known personal wireless transmitter/receiver device art, the present invention provides a novel shower transmitter/receiver speaker system. The general purpose of the present invention, which will be described subsequently in greater detail, is to provide convenience of use of a universal personal electronic wireless enabled device for listening to music and taking or receiving phone calls while showering.

The present invention, shower transmitter/receiver speaker system as disclosed herein, preferably comprises a shower music receiver assembly having a shower bottle rack with a suspension frame having a first side and a second side, a suspension hook, at least one shelf, a wireless transmitter/receiver having a housing with at least one speaker, a microphone, a control button, a multi-purpose call button, and an indicator light.

The shower music receiver assembly with the shower bottle rack and the wireless transmitter/receiver is operatively multi-functional for holding bottles and receiving and transmitting a voice communication from a cell phone, and receiving a recorded sound such as music from a transmitting device, while the user is simultaneously showering. The wireless transmitter/receiver is structured and arranged to wirelessly initiate and to receive a phone call from a cellular phone via the multi-purpose call button when the wireless transmitter/receiver is paired with the cellular phone. The wireless transmitter/receiver is able to amplify the received sound from the cellular phone via the speakers and the volume level adjustment of the control button of the wireless transmitter/receiver and receive a ringtone from the paired cellular phone from an incoming call. A voice communication is able to be received and broadcast over the speakers, and sent via the microphone of the shower music receiver assembly to a cellular phone. The wireless transmitter/receiver is also able to receive streaming audio sounds such as music from devices like wireless computers or music streamed wirelessly from cellular phones.

The first side and the second side of the suspension frame are preferably parallel planar and spaced apart such that the at least one shelf may be non-removably attached between the two sides or may be attached across the front of the spaced apart first side and second side. The first side and the second side of the suspension rack are positioned vertically and extend upwardly to converge at an apex or a center point of which forms a suspension hook for hanging the suspension rack from a shower spray nozzle. The bottom end of the shower bottle rack also comprises at least one multipurpose hook, but may comprise as many as five in some embodiments. Two multipurpose hooks are preferable. The wireless transmitter/receiver is attached to the bottom side of one shelf of the suspension rack, preferably the top shelf, in such a way that the controls are accessible and do not interfere with placement of bottles placed on a shelf. At least one shelf of the shower bottle rack preferably comprises a rectangular basket so that the bottles are able to be contained therein.

The shower bottle rack is preferably about 18 inches in height, about 15 inches in width, and about 4½ inches in depth such that the shower bottle rack is able to hold a plurality of bottles and the wireless transmitter/receiver. At least one speaker, a microphone, a control button, a multi-purpose call button, and an indicator light are contained within the housing such that each are operable from the exterior of the housing. The indicator light of the wireless transmitter/receiver is able to communicate a power-on condition to the user via an illuminated light emitting diode. The housing of the wireless transmitter/receiver is water proof such that the electronic components within the wireless transmitter/receiver are moisture-damage protected.

The microphone, the control button, the multi-purpose call button, and the indicator light are all in operative communication with each other to perform a plurality of functions. The outer ring of the control button preferably comprises four control quadrants, an upper quadrant, a right side quadrant, a lower quadrant, and a left side quadrant. The circular center button of the control button may also comprise a pause function and a play function. The upper quadrant preferably comprises a volume increase control and the lower quadrant comprises a volume lower control, and the left quadrant comprises a channel down control and the right quadrant comprises a channel up control. The shower music receiver assembly is most useful for receiving music or sending and receiving phone calls from a cell phone while the user is showering or in a similar environment.

A kit is embodied herein for the shower transmitter/receiver speaker system preferably comprising: at least one shower bottle rack; at least one wireless transmitter/receiver; at least one fastener for attaching the wireless transmitter/receiver to the bottom side of one shelf; and at least one set of user instructions.

In accordance with the embodiments of the present invention a preferred method of use is disclosed herein preferably comprising the steps of: adjusting a cellular phone to play a streaming musical sound; pressing the power button to power the wireless transmitter/receiver of the shower music receiver assembly; adjusting the wireless transmitter/receiver to receive the streaming musical sound while the user is showering; adjusting the volume of the streaming musical sound via the control button; pressing the multi-purpose call button on the wireless transmitter/receiver to wirelessly initiate and alternately to receive a phone call on the paired cellular phone; adjusting the volume of the received phone call; and ending the phone call by depressing the control button; and pressing the power button to turn off the wireless transmitter/receiver.

The present invention holds significant improvements and serves as a shower transmitter/receiver speaker system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, shower transmitter/receiver speaker system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a personal wireless transmitter/receiver device and more particularly to a shower transmitter/receiver speaker system as used to improve the convenience of use of a universal personal electronic wireless enabled device for listening to music and taking or receiving phone calls while showering.

Generally speaking, the shower transmitter/receiver speaker system is an electronic device that is able to be paired to a cell phone, a wireless lap top, or a tablet and is able to receive voice and streaming music transmissions from the cell phone. The shower transmitter/receiver speaker system is also able to place phone calls or transmit voice commands to the cell phone. The shower music receiver assembly is able to receive and amplify the audio to a user preferred volume using the control button volume adjustment.

Figure 1:
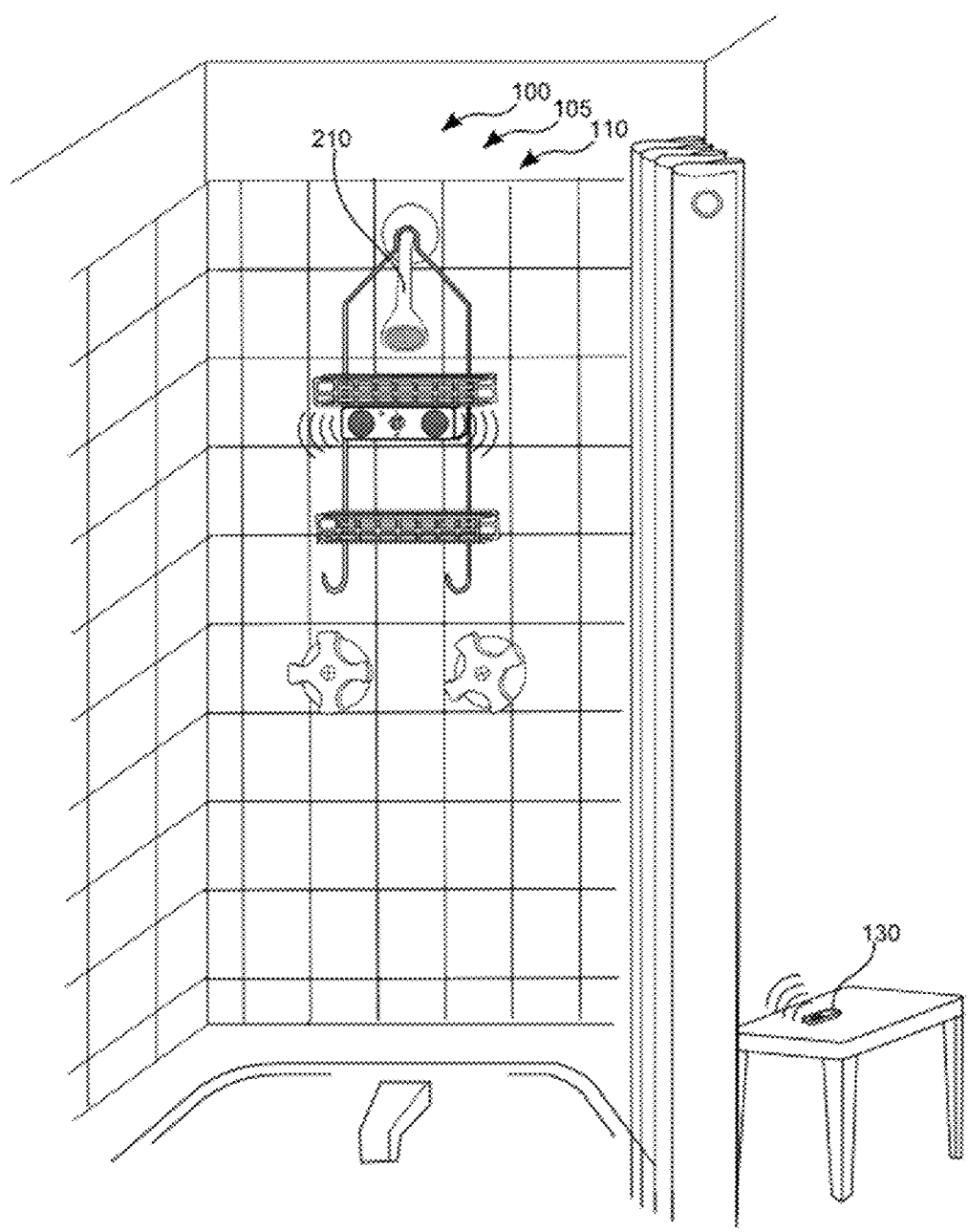
FIG. 1 shows a perspective view illustrating an in-use condition of the shower transmitter/receiver speaker system according to an embodiment of the present invention.

In greater detail now, referring to the drawings by numerals of reference there is shown in FIG. 1, a perspective view illustrating an in-use condition of shower transmitter/receiver speaker system 100 according to an embodiment of the present invention.

Shower music receiver assembly 105 with shower bottle rack 110 and wireless transmitter/receiver 120 is operatively functional for holding bottles and receiving and transmitting voice communication from cellular phone 130, and receiving recorded sound from transmitting device 135 while user is simultaneously showering. Wireless transmitter/receiver 120 is structured and arranged to wirelessly initiate and to receive a phone call from cellular phone 130 via multi-purpose call button when wireless transmitter/receiver 120 is paired with cellular phone 130. Wireless transmitter/receiver 120 is able to amplify a received sound from cellular phone 130 via speakers 140 and volume level adjustment 145 of control button 150 of wireless transmitter/receiver 120 and receive a ringtone from a paired cellular phone 130 from an incoming call.

Figure 2:
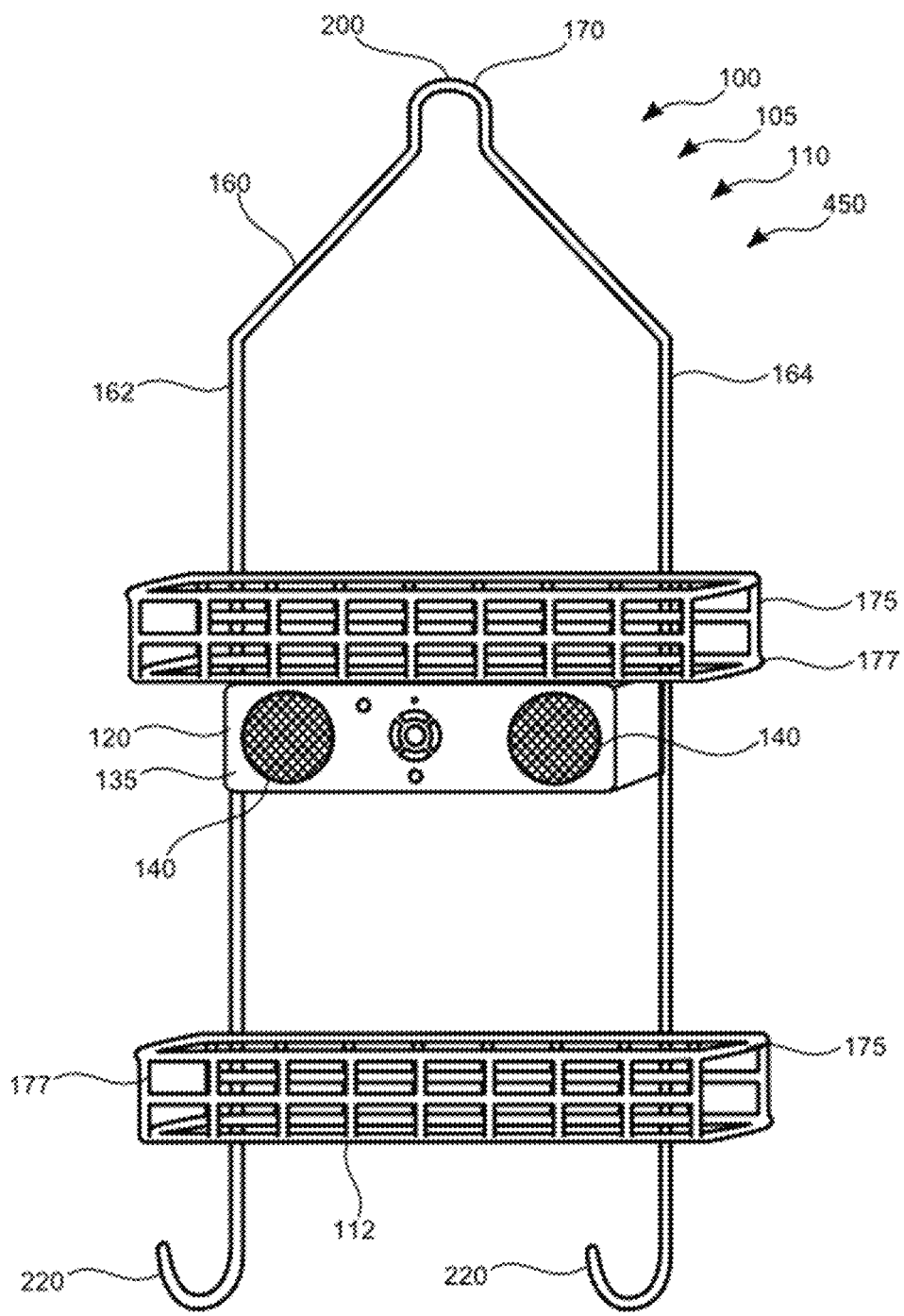
FIG. 2 is a perspective view illustrating a front view of the shower transmitter/receiver speaker system according to an embodiment of the present invention of FIG. 1.

Referring now to FIG. 2, a front view of shower transmitter/receiver speaker system 100 according to an embodiment of the present invention of FIG. 1.

Shower transmitter/receiver speaker system 100 preferably comprises shower music receiver assembly 105 having shower bottle rack 110 with suspension frame 160 having first side 162 and second side 164, suspension hook 170, at least one shelf 175, wireless transmitter/receiver 120 having housing 180 with at least one speaker(s) 140, microphone 185, control button 150, multi-purpose call button 190, and an indicator light 199. First side 162 and second side 164 of suspension frame 160 are parallel planar and spaced apart such that at least one shelf 175 is non-removably attached between first side 162 and second side 164.

First side 162 and second side 164 of suspension frame 160 are positioned vertically and extend upwardly to converge at an apex or center point 200 of which forms suspension hook 170 for hanging shower bottle rack 110 from shower spray nozzle 210. Bottom end 112 of shower bottle rack 110 also comprises at least one multipurpose hook 220, but may comprise as many as five in some embodiments. Two multipurpose hooks 220 are preferable. Wireless transmitter/receiver 120 is attached to bottom end 112 of one shelf 175 of suspension frame 160 in such way that controls are accessible and do not interfere with placement of bottles placed on shelf 175. At least one shelf 175 of shower bottle rack 110 preferably comprises rectangular basket 177 so that shampoo bottles or the like are able to be contained therein. Shower bottle rack 110 is preferably about 18 inches in height, about 15 inches in width, and about 4½ inches in depth such that shower bottle rack 110 is able to hold a plurality of bottles.

Figure 3:
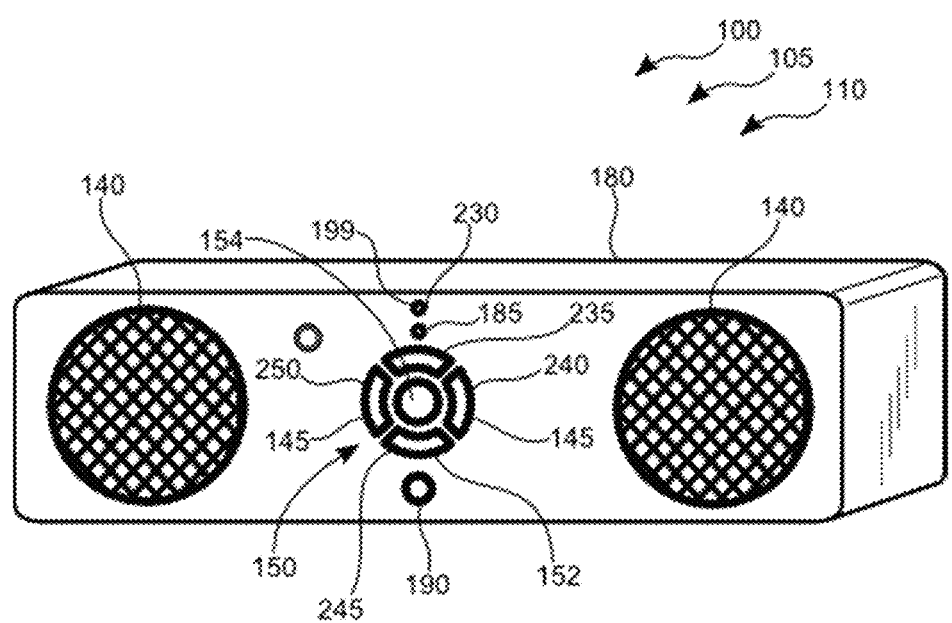
FIG. 3 is a perspective view illustrating the wireless transmitter/receiver of the shower transmitter/receiver speaker system according to an embodiment of the present invention of FIG. 1.

Referring now to FIG. 3, a perspective view illustrating wireless transmitter/receiver 120 of shower transmitter/receiver speaker system 100 according to an embodiment of the present invention of FIG. 1.

At least one voice communication is able to be received and broadcast over speaker(s) 140, and sent via microphone 185 of shower music receiver assembly 105 to cellular phone 130. Wireless transmitter/receiver 120 is also able to receive streaming audio sounds such as music from devices like wireless computers or music streamed wirelessly from cellular phones 130. At least one speaker(s) 140, microphone 185, control button 150, multi-purpose call button 190, and indicator light 199 are contained within housing 180 such that each are operable from exterior of housing 180.

Indicator light 199 of wireless transmitter/receiver 120 is able to communicate a power-on condition to a user via an illuminated light emitting diode 230. Housing 180 of wireless transmitter/receiver 120 is water proof such that electronic components within wireless transmitter/receiver 120 are moisture-damage protected. Microphone 185, control button 150, multi-purpose call button 190, and indicator light 199 are all in operative communication with each other. Outer ring 152 of control button 150 preferably comprises four control quadrants, upper quadrant 235, right side quadrant 240, lower quadrant 245, and left side quadrant 250. Circular center button 154 of control button 150 may also comprise a pause function and a play function. Upper quadrant 235 preferably comprises a volume increase control and lower quadrant 245 comprises a volume lower control, and left side quadrant 250 comprises a channel down control and right side quadrant 240 comprises a channel up control. Shower music receiver assembly 105 is useful for receiving music or sending and receiving phone calls from cellular phone 130 or music from a wireless laptop while the user is showering or in other similar environments.

Shower transmitter/receiver speaker system 100 may be sold as kit 450 comprising the following parts: at least one shower bottle rack 110; at least one wireless transmitter/receiver 120; at least one fastener for attaching wireless transmitter/receiver 120 to bottom end 112 of one shelf 175; and at least one set of user instructions. The kit has instructions such that functional relationships are detailed in relation to the structure of the invention (such that the invention can be used, maintained, or the like in a preferred manner). Shower transmitter/receiver speaker system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different hanging/receiving/transmitting means, parts may be sold separately, etc., may be sufficient.

Figure 4:
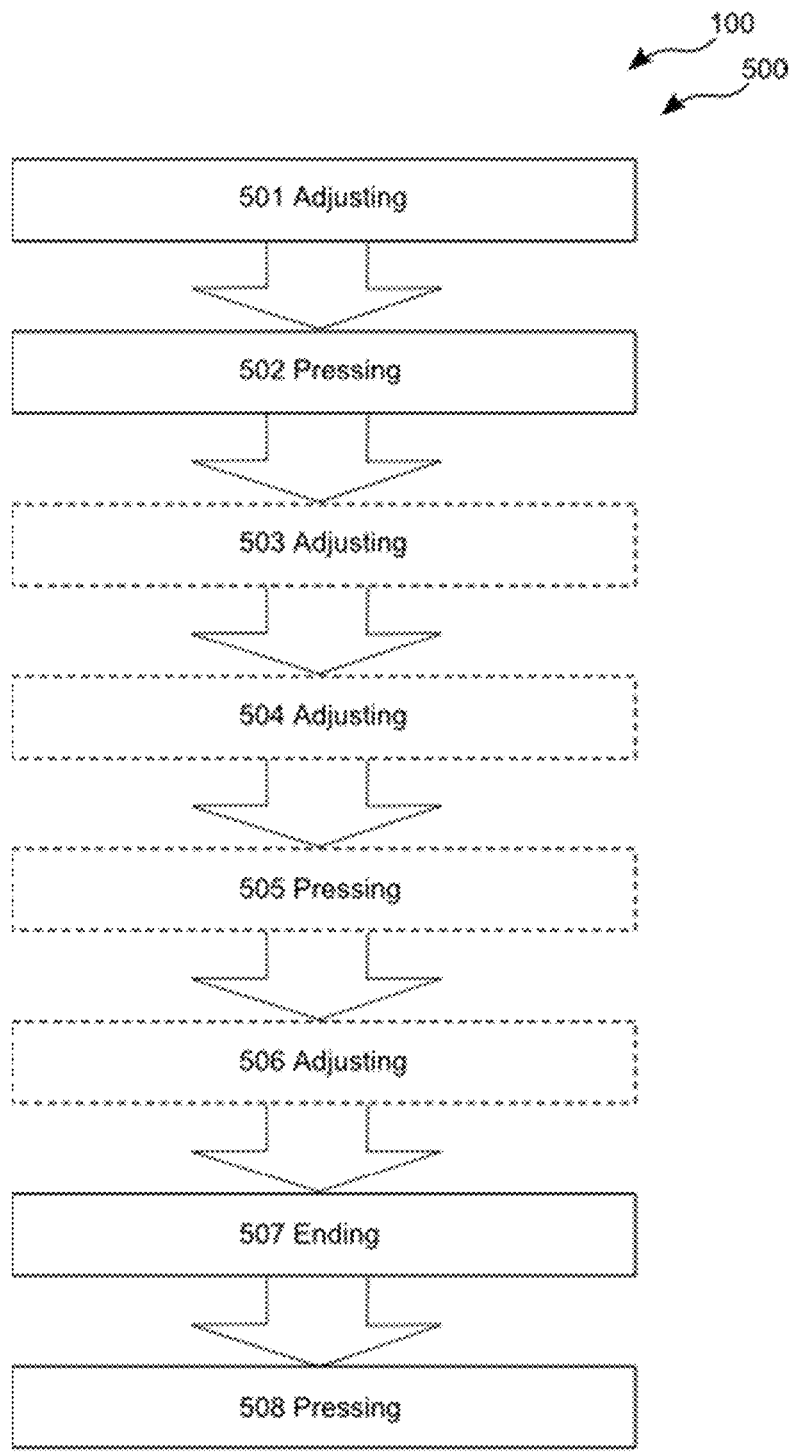
FIG. 4 is a flowchart illustrating a method of use for the shower transmitter/receiver speaker system according to an embodiment of the present invention of FIGS. 1-4.

Referring now to FIG. 4, showing method of use 500 for shower transmitter/receiver speaker system 100.

A method of using (method of use 500) shower transmitter/receiver speaker system 100 may comprise the steps of step one 501 adjusting cellular phone 130 to play a streaming musical sound; step two 502 pressing a power button to power wireless transmitter/receiver 120 of shower music receiver assembly 105; step three 503 adjusting wireless transmitter/receiver 120 to receive the streaming musical sound while the user is showering; step four 504 adjusting the volume of the streaming musical sound via control button 150; step five 505 pressing multi-purpose call button 190 on wireless transmitter/receiver 120 to wirelessly initiate and alternately to receive a phone call on the paired cellular phone 130; step six 506 adjusting the volume of the received phone call; step seven 507 ending the phone call by depressing control button 150; and step eight 508 pressing the power button to turn off wireless transmitter/receiver 120.

It should be noted that steps 503-506 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A shower audio transmitter/receiver system comprising:
   a shower music receiver assembly comprising;
      a shower bottle rack having;
      a suspension frame having a first side and a second side;
      a suspension hook; and
      at least one shelf;
      a wireless transmitter/receiver having;
      a housing;
      at least one speaker;
      a microphone; a control button;
      a multi-purpose call button; and
      an indicator light;
      wherein said shower music receiver assembly with said shower bottle rack and said wireless transmitter/receiver is operatively functional for holding bottles and receiving and transmitting a voice communication from a cell phone, and receiving a recorded sound from a transmitting device while a user is simultaneously showering within a moisture-rich environment;
      wherein said first side and said second side of said suspension frame are parallel planar and spaced apart such that said at least one shelf is non removably attached between said first side and said second side of said suspension frame;
      wherein said first side and said second side of said suspension rack are positioned vertically and extend upwardly to converge at a center point, said center point forming said suspension hook for hanging said suspension rack from a shower spray nozzle;
      wherein said wireless transmitter/receiver is attached to a bottom side of a single said shelf of said suspension rack;
      wherein said at least one speaker, said microphone, said control button, said multi-purpose call button, and said indicator light are contained within said housing such that each are operable from an exterior of said housing; and wherein said microphone, said control button, said multi-purpose call button, and said indicator light are in operative communication with each other;
      wherein said wireless transmitter/receiver is structured and arranged to wirelessly initiate and to receive a phone call on a cellular phone via said multi-purpose call button, said wireless transmitter/receiver paired with said cellular phone; and
      wherein said wireless transmitter/receiver is able to amplify a received sound from said cellular phone, said volume level adjustable via said control button of said wireless transmitter/receiver; and
      wherein said housing of said wireless transmitter/receiver is water proof such that at least one electronic component within said wireless transmitter/receiver is moisture-damage protected; and
      wherein said indicator light of said wireless transmitter/receiver is able to communicate a power-on condition to said user via an illuminated light emitting diode; and
      wherein said wireless transmitter/receiver is able to receive a ringtone from a paired said cellular phone; and
      wherein said wireless transmitter/receiver is able to receive and play a music streamed wirelessly from said cellular phone; and
      wherein said at least one shelf of said shower bottle rack comprises a rectangular basket such that said bottles are able to be contained therein without falling out of said rectangular basket; and
      wherein said control button comprises a circular center button within an outer ring, and
      wherein said outer ring of said control button comprises four control quadrants, an upper quadrant, a right side quadrant, a lower quadrant, and a left side quadrant; and
      wherein said upper quadrant comprises a volume increase control and said lower quadrant comprises a volume lower control, and said left quadrant comprises a channel down control and said right quadrant comprises a channel up control; and
      wherein said circular center button of said control button comprises a pause function and a play function; and
      wherein said shower bottle rack is about 18 inches in height, about 15 inches in width, and about 4½ inches in depth such that said shower bottle rack is able to hold a plurality of bottles and said wireless transmitter/receiver; and
      wherein said shower music receiver assembly is useful for receiving music and alternately phone calls from a cell phone while said user is showering.

2. The shower audio transmitter/receiver system of claim 1 wherein said wireless transmitter/receiver is able receive a voice communication via said microphone and transmit said voice communication to said cellular phone.

3. The shower audio transmitter/receiver system of claim 1 wherein said wireless transmitter/receiver is able to receive a ringtone from a paired said cellular phone.

4. The shower audio transmitter/receiver system of claim 1 wherein said wireless transmitter/receiver is able to receive a streaming audio sound from a wireless computer.

5. The shower audio transmitter/receiver system of claim 1 wherein said control button further comprises a volume increase, a volume decrease, a channel up, and a channel down control.

6. The shower audio transmitter/receiver system of claim 1 wherein said at least one shelf of said shower bottle rack comprises a rectangular basket such that said bottles are able to be contained therein without falling out of said rectangular basket.

7. The shower audio transmitter/receiver system of claim 1 wherein said bottom end of said shower bottle rack comprises at least one multipurpose hook.

8. A shower audio transmitter/receiver system comprising:
   a shower music receiver assembly comprising;
   a shower bottle rack having;
   a suspension frame having a first side and a second side;
   a suspension hook; and
   at least one shelf;
   a wireless transmitter/receiver having;
   a housing;
   at least one speaker;
   a microphone;
   a control button;
   a multi-purpose call button; and
   an indicator light;

wherein said shower music receiver assembly with said shower bottle rack and said wireless transmitter/receiver is operatively functional for holding bottles and receiving and transmitting a voice communication from a cell phone, and receiving a recorded sound from a transmitting device while a user is simultaneously showering;

wherein said wireless transmitter/receiver is structured and arranged to wirelessly initiate and to receive a phone call on a cellular phone via said multi-purpose call button, said wireless transmitter/receiver paired with said cellular phone;

wherein said wireless transmitter/receiver is able to amplify a received sound from said cellular phone, said volume level adjustable via said control button of said wireless transmitter/receiver;

wherein said wireless transmitter/receiver is able to receive a ringtone from a paired said cellular phone;

wherein said wireless transmitter/receiver is able receive a voice communication via said microphone from said user and transmit said voice communication to said cellular phone;

wherein said wireless transmitter/receiver is able to receive a streaming audio sound from a wireless computer;

wherein said wireless transmitter/receiver is able to receive and play a music streamed wirelessly from said cellular phone;

wherein said first side and said second side of said suspension frame are parallel planar and spaced apart such that said at least one shelf is non removably attached between said first side and said second side of said suspension frame;

wherein said first side and said second side of said suspension rack are positioned vertically and extend upwardly to converge at a center point, said center point forming said suspension hook for hanging said suspension rack from a shower spray nozzle;

wherein said bottom end of said shower bottle rack comprises at least one multipurpose hook;

wherein said wireless transmitter/receiver is attached to a bottom side of a single said shelf of said suspension rack;

wherein said at least one shelf of said shower bottle rack comprises a rectangular basket such that said bottles are able to be contained therein without falling out of said rectangular basket;

wherein said shower bottle rack is about 18 inches in height, about 15 inches in width, and about 4½ inches in depth such that said shower bottle rack is able to hold a plurality of bottles and said wireless transmitter/receiver;

wherein said at least one speaker, said microphone, said control button, said multi-purpose call button, and said indicator light are contained within said housing such that each are operable from an exterior of said housing;

wherein said indicator light of said wireless transmitter/receiver is able to communicate a power-on condition to said user via an illuminated light emitting diode;

wherein said housing of said wireless transmitter/receiver is water proof such that at least one electronic component within said wireless transmitter/receiver is moisture-damage protected;

wherein said microphone, said control button, said multi-purpose call button, and said indicator light are in operative communication with each other;

wherein said outer ring of said control button comprises four control quadrants, an upper quadrant, a right side quadrant, a lower quadrant, and a left side quadrant;

wherein said circular center button of said control button comprises a pause function and a play function;

wherein said upper quadrant comprises a volume increase control and said lower quadrant comprises a volume lower control, and said left quadrant comprises a channel down control and said fight quadrant comprises a channel up control; and further comprising a kit including: at least one said shower bottle rack; at least one said wireless transmitter/receiver; at least one fastener for attaching said wireless transmitter/receiver to said bottom side of a single said shelf; and at least one set of user instructions;

wherein said shower music receiver assembly is useful for receiving music and alternately transmitting and receiving phone calls from a cell phone while said user is showering.

\* \* \* \* \*